United States Patent Office 3,284,471
Patented Nov. 8, 1966

3,284,471
PREPARATION OF 1,2,3,4-TETRACHLORO-9-ANTHRONE
Paul Kniel, Muttenz, Switzerland, assignor to Ciba Limited, Basel, Switzerland, a Swiss company
No Drawing. Filed Jan. 28, 1963, Ser. No. 254,465
Claims priority, application Switzerland, Feb. 2, 1962, 1,309/62
6 Claims. (Cl. 260—351)

The present invention provides an elegant process for the manufacture of 1,2,3,4-tetrachloro-9-anthrone wherein the Diels-Alder adduct prepared from a 5,5-dialkoxy-1,2,3,4-tetrachlorocyclopentadiene and 1,4-naphthoquinone of the Formula 1 is heated with an agent that splits off ether. The reaction probably proceeds as follows:

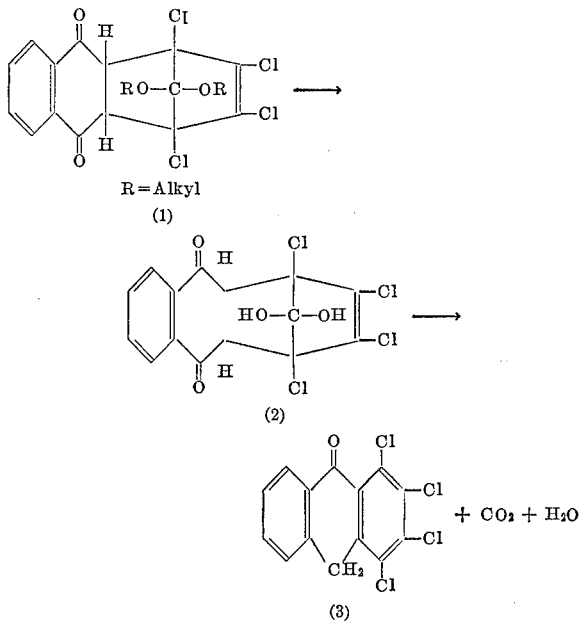

The compound of Formula 1 used as starting materials can easily be obtained by heating equimolecular proportions of a 5,5-dialkoxy-, especially dimethoxy-1,2,3,4-tetrachlorocyclopentadiene and 1,4-naphthoquinone (cf. my U.S. patent application No. 174,677, filed February 21, 1962, now abandoned).

As agents capable of splitting off ether hydrohalic acids are primarily used, for example, hydrochloric acid, hydrobromic acid and more especially hydriodic acid, advantageously in the presence of red phosphorus. Concentrated aqueous solutions are preferably used suitably at least 1 part by volume per 1 part of the adduct, advantageously in the presence of a diluent such as glacial acetic acid. The reaction is advantageously carried out at a raised temperature, preferably at a temperature above 100 C., if necessary, under superatmospheric pressure.

The tetrachloranthrone so obtained can be isolated from the reaction mixture by filtration; it is obtained in good yield and in a high degree of purity. If hydriodic acid and red phosphorus are used to split off the ether, it is of advantage to dissolve the crude tetrachloranthrone in an organic solvent and to filter the solution so as to remove residual phosphorus. The tetrachloranthrone can be recovered from the solution by evaporation or crystallization. It can be used as a dyestuff intermediate product, for example, for the preparation of disperse dyestuffs or vat dyestuffs, for example, pigments of the acedianthrone series.

Unless otherwise stated, the parts and percentages in the following example are by weight:

Example 21 parts of the Diels-Alder adduct prepared from 1,4-naphthoquinone and 5,5-dimethoxy-1,2,3,4-tetrachlorocyclopentadiene, 320 parts by volume of glacial acetic acid, 35 parts by volume of 57% hydriodic acid and 4 parts of red phosphorus were boiled for 24 hours under reflux. After a time, yellow crystals precipitated from the solution, which was clear at the start. After cooling, the precipitate was filtered and the filter cake washed successively with glacial acetic acid and water. To remove the residual phosphorus, the filter cake was dried or free from moisture with a small amount of cold methyl alcohol, dissolved in 400 parts by volume of hot chloroform and the solution filtered. After the chloroform had been evaporated, 12.6 parts of 1,2,3,4-tetrachloro-9-anthrone were obtained, which corresponded to 75.8% of the theoretical yield. It melted at 210 to 211° C. (uncorrected).

Analysis.—Calculated for $C_{14}H_6OCl_4$: C, 50.64%; H, 1.82%; Cl, 42.72%. Found: C, 50.63%; H, 1.86%; Cl, 42.61%.

By using, instead of the 5,5-dimethoxy-1,2,3,4-tetrachlorocyclopentadiene adduct, 23.9 parts of the 5,5-di-n-propoxy-1,2,3,4-tetrachlorocyclopentadiene-1,4-naphthoquinone adduct, 1,2,3,4-tetrachloro-9-anthrone was obtained in a yield of 41%.

Oxidation to 1,2,3,4-tetrachloranthraquinone.—10 parts of 1,2,3,4-tetrachloro-9-anthrone, 300 parts by volume of glacial acetic acid and 10 parts of chromium trioxide, dissolved in 10 parts of water, were boiled for 1 hour under reflux. A small amount of active carbon was added to the hot solution, and the solution filtered. The pure 1,2,3,4-tetrachloranthraquinone which crystallized in the form of long yellow needles was filtered off, washed successively with glacial acetic acid and water and dried.

The yield was 8.85 parts or 84.9% of the theoretical, and the melting point was 190° C. (uncorrected).

The product so obtained was identical with the 1,2,3,4-tetrachloranthraquinone obtained by a known process from tetrachlorophthalic acid anhydride and benzene.

Manufacture of disperse dyestuffs.—(a) 10 parts of tetrachloranthrone were suspended in 200 parts by volume of 96% sulfuric acid and to this suspension were added, at 0 to 5° C. and in the course of 1 hour, 8.3 parts of 50% mixed acid. The mixture was maintained at 0 to 5° C. for a further 2 hours, then stirred for 4 hours at 20 to 25° C., poured on to a mixture of ice and water, filtered, the filter residue washed until neutral and then dried.

The yield was 10.9 parts of a reddish brown powder.

3 parts of the nitro compound were heated for 1 hour at 150 to 155° C., while stirring, with 1 part of ethanolamine and 50 parts of aniline. After cooling, the reaction mixture was poured on to a mixture of ice and water, acidified with hydrochloric acid, washed with water until neutral and dried.

The yield was 3.6 parts of a dark powder.

The dyestuff so obtained dyed polyamide and polyester fibers a violet brown tint when applied as an aqueous dispersion.

(b) A solution of 3 parts of the nitro compound obtained as described in paragraph (a) in 20 parts by volume of acetone was added to 10 parts of 4-aminophenol dissolved in 50 parts by volume of 2 N sodium hydroxide solution, and the whole heated for 1 hour under reflux. The mixture was then poured into water, acidified with hydrochloric acid and filtered, the filter residue washed until neutral and then dried.

The yield was 3.7 parts of a dark powder.

The dyestuff so obtained dyed polyamide fibers a brown tint.

What is claimed is:
1. A process for the manufacture of 1,2,3,4-tetrachloro-9-anthrone, wherein a compound of the formula

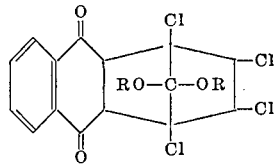

in which R is alkyl is heated to temperatures of at least 100° C. with a hydrohalic acid.

2. The process according to claim 1 wherein R is methyl.

3. A process as claimed in claim 1, wherein hydriodic acid is used.

4. A process as claimed in claim 1, wherein the reaction is carried out in the presence of red phosphorus.

5. A process as claimed in claim 1, wherein at least 1 part by volume of a concentrated aqueous solution of the hydrohalic acid per 1 part of the said compound is used.

6. A process as claimed in claim 5, wherein glacial acetic acid is used as diluent.

References Cited by the Examiner

Barnett et al.: "Deut. Chem. Ber.," 66B, pp. 1876–1891 (1933).
Hoch: "J. Org. Chem.," vol. 26, pp. 2066–2072 (1961).
Houben-Weyl: "Methoden der Organischen Chemie," 5/4 (1952), pp. 630–631.

LORRAINE A. WEINBERGER, *Primary Examiner.*

LEON ZITVER, *Examiner.*

R. K. JACKSON, H. C. WEGNER,
*Assistant Examiners.*